Jan. 9, 1951     C. F. LE MAY     2,537,274
MICROMETRICALLY ADJUSTABLE BORING TOOL
Filed June 5, 1948
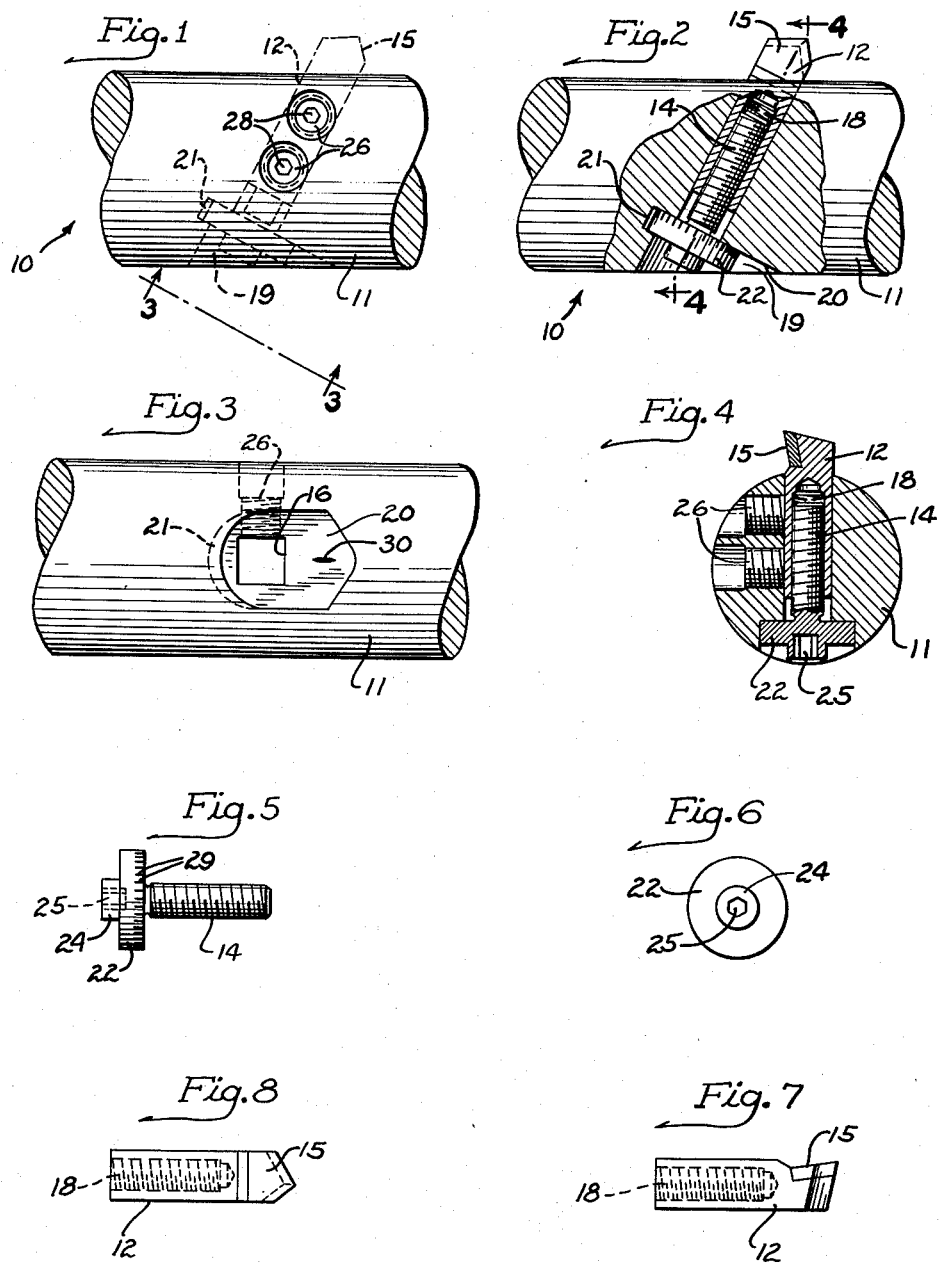
INVENTOR.
Carl F. LeMay
BY
Carlson, Pitzner, Hubbard & Wolfe
Attys.

Patented Jan. 9, 1951

2,537,274

UNITED STATES PATENT OFFICE 2,537,274

MICROMETRICALLY ADJUSTABLE BORING TOOL

Carl F. Le May, Detroit, Mich., assignor to Ex-Cell-O Corporation, Detroit, Mich., a corporation of Michigan Application June 5, 1948, Serial No. 31,283

1 Claim. (Cl. 77—56)

The present invention pertains generally to devices for use in machine tools and more specifically to a novel form of adjustable boring tool.

One object of the invention is to provide a precisely adjustable boring tool of extremely simple, sturdy construction and which will lend itself readily to economical manufacture.

Another object is to provide a boring tool of the foregoing character which will be susceptible of easy adjustment and yet capable of being rigidly locked once a desired condition of adjustment has been reached.

Other objects and advantages of the invention will become apparent as the following detailed description proceeds, taken in the light of the accompanying drawings, in which:

Figure 1 is an enlarged fragmentary plan view of an illustrative boring tool embodying the present invention.

Fig. 2 is a view similar to Fig. 1 but with a portion of the boring bar broken away to show internal details of the tool.

Fig. 3 is an elevation of the tool shown in Fig. 2 and taken in the plane of the line 3—3, the adjusting screw and tool bit being omitted.

Fig. 4 is a broken sectional view taken transversely through the tool of Fig. 2 and in the plane of the line 4—4.

Fig. 5 is a side view of the graduated adjusting screw.

Fig. 6 is an end view of the adjusting screw shown in Fig. 5.

Fig. 7 is a side elevation of the tool bit shown in Figs. 1, 2 and 4.

Fig. 8 is a plan view of the tool bit of Fig. 7.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claim.

Upon more specific reference to the drawings, it will be perceived that the invention is there exemplified in the form of a boring tool designated generally by the reference numeral 10. The tool 10 comprises a boring bar 11 which supports a tool bit 12 together with a suitable adjusting screw 14 for extending or retracting the former. The tool bit 12 may be ground to any appropriate contour for a particular boring operation and in the present instance is provided with a hardened cutting tip 15 of carbide or the like. The boring bar 11 may, of course, be supported at one or both ends in a manner well known in the art.

As shown in the drawing, the boring bar 11 in this instance is of substantially cylindrical cross section and is preferably formed from a length of round stock. For slidably supporting the tool bit 12, the bar 11 is fashioned with a generally transverse passageway 16 having a longitudinal axis disposed in skewed relation to that of the boring bar 11. Since the tool bit in the illustrative boring tool is of generally rectangular cross section, the passageway 16 is formed with a similar but slightly larger cross section so as to create a comfortable sliding fit with respect to the bit 12.

To render the tool bit 12 axially adjustable with respect to the screw 14 in response to rotation of the same, the bit 12 is provided with a relatively deep longitudinal bore 18. The latter is formed with internal micrometer threads of appropriate size to mesh neatly with a corresponding micrometer threads on the adjusting screw 14. Although the bore 18 extends along a substantial portion of the tool bit, the former preferably terminates short of that portion of the tool bit 12 which normally includes the plane of maximum stress when the tool is in an operative condition. Thus there is no appreciable weakening of the tool bit 12 since it will have substantially a full cross section of stock available to withstand the shear stress imposed along the above plane during a boring operation. Moreover, the use of the bore 18 results in a significant saving in the amount of high grade steel used in the tool bit.

Provision is made for mounting the adjusting screw 14 and the tool bit 12 within the boring bar 11 so as to preclude longitudinal movement of the screw 14 while at the same time permitting the latter to be rotated. Furthermore, this is accomplished in an extremely simple manner and without the use of additional parts by taking advantage of the skewed relation between the longitudinal axes of the passageway 16 and the boring bar 11. Referring more particularly to Figs. 2 and 3, it will be observed that a recess 19 is milled or otherwise cut into the boring bar 11 adjacent one end of the skewed transverse passageway 16 so as to define a flat 20 which lies substantially perpendicular to the axis of the passageway 16. Also defined by the recess 19 adjacent the innermost end of the same is an arcuate crescent-shaped slot 21 having its innermost lateral wall coplanar with the bottom of such recess. The slot 21 is of appropriate width to receive the cylindrical flanged head 22 of the adjusting screw 14. With this arrangement, the screw 14 by itself may be freely inserted and removed from the passageway 16 and by the same token its flange 22 may easily be inserted and removed from the slot 21. When, however, the tool bit 12 is inserted into the opposite end of the passageway 16 and drawn up into operating position by threaded engagement with the screw 14, the flange 22 of the latter becomes securely engaged by the slot 21. Under these circumstances, axial movement of the screw 14 will be precluded by the slot 21 and rotation of the screw 14 will thus result in extending or retracting the tool bit 12 along the axis of the passageway 16. To facilitate turning of the screw 14, the latter may be formed with a boss 24 at its outer end, the boss, in turn, being provided with a polygonal recess 25 which is engageable by any appropriate wrench.

While the construction just described is fully operative, there must inevitably be a slight amount of backlash or lost motion in the screw threads and also between the flange 22 and the side walls of the slot 21. Theoretically this lost motion, when once taken up by an initial adjustment, will have no further effect upon the positioning of the tool bit 12 as long as adjustments are made by rotating the screw 14 in the same direction. This is due to the fact that micrometer type screw threads have a self-locking characteristic. For precision boring operations, however, suitable means must be provided to guard against inaccuracies induced by vibration of the parts or due to some other operating condition. Thus the boring bar 11 is equipped with one or more locking screws 26 which threadedly engage tapped holes running substantially perpendicular to the passageway 16 and intersecting therewith. The screws 26, like the adjusting screw 14, may have polygonal recesses 28 to enable them to be tightened snugly against the tool bit 12 after the latter has been adjusted to a desired position.

For the purpose of facilitating the adjustment of the tool bit 12, the flange 22 of the screw 14 may be calibrated to allow for the angularity of its movement with respect to the axis of the boring bar 11. Thus the periphery of the flange 22 may be provided with a series of graduations 29 arranged to read, for example, in tens of thousandths of an inch. A reference mark 30 is also provided on the flat 20 of the boring bar for use with the graduations 29 on the adjusting screw flange.

In the light of the foregoing, it will be appreciated that there has been provided a boring tool of extremely simple and economical construction. Furthermore, by reason of its novel arrangement, the tool is sturdy and reliable and capable of use in boring operations requiring a high degree of precision.

I claim as my invention:

In a boring tool, the combination of a boring bar having a generally rectangular passageway running transversely thereof, said boring bar also having adjacent one end of the passageway a recess including a crescent-shaped slot, the innermost lateral wall of said slot being coplanar with the bottom of the recess, an axially slidable tool bit of rectangular cross section housed within the passageway of said boring bar, said tool bit having a coaxial threaded bore running longitudinally thereof, an adjusting screw adapted to threadedly engage said tool bit for adjustment of the same axially of the passageway of said boring bar, and a head of general cylindrical shape integral with said adjusting screw and having peripheral graduations thereon to facilitate adjustment of said tool bit, said head being engageable on one end by the bottom of said recess and said innermost lateral wall of said slot, said head also being engageable on the opposite end by the other lateral wall of said crescent-shaped slot.

CARL F. LE MAY.

REFERENCES CITED

The following references are of record in the file of this patent:

UNITED STATES PATENTS

| Number | Name | Date |
|---|---|---|
| 2,096,489 | Hassig | Oct. 19, 1937 |
| 2,274,007 | Smith | Feb. 24, 1942 |